US006887308B2

(12) United States Patent
Zhang

(10) Patent No.: US 6,887,308 B2
(45) Date of Patent: May 3, 2005

(54) METAL COATING COUPLING COMPOSITION

(75) Inventor: Jun Qing Zhang, Mason, OH (US)

(73) Assignee: JohnsonDiversey, Inc., Sturtevant, WI (US)

( * ) Notice: Subject to any disclaimer, the term of this patent is extended or adjusted under 35 U.S.C. 154(b) by 0 days.

(21) Appl. No.: 10/348,319

(22) Filed: Jan. 21, 2003

(65) Prior Publication Data

US 2004/0139887 A1 Jul. 22, 2004

(51) Int. Cl.[7] .............................. C09D 4/00; C09D 5/00
(52) U.S. Cl. .............................. 106/287.1; 106/287.11; 106/287.13; 106/287.14; 106/287.15; 106/287.16
(58) Field of Search ........................ 106/287.1, 287.11, 106/287.13, 287.14, 287.15, 287.16

(56) References Cited

U.S. PATENT DOCUMENTS

| | | |
|---|---|---|
| 1,710,743 A | 4/1929 | Pacz |
| 2,854,368 A | 9/1958 | Shreir .................. 148/6.15 |
| 3,547,710 A | 12/1970 | Kronstein ............... 148/6.14 |
| 3,682,713 A | 8/1972 | Ries ..................... 148/6.14 |
| 3,695,942 A | 10/1972 | Binns .................... 148/6.15 |
| 3,895,970 A | 7/1975 | Blum .................... 148/6.15 |
| 3,975,214 A | 8/1976 | Kulick ................... 148/6.15 |
| 4,148,670 A | 4/1979 | Kelly .................... 148/6.15 |
| 4,191,596 A | 3/1980 | Dollman ................. 148/6.27 |
| 4,433,015 A | 2/1984 | Lindert .................. 427/388.4 |
| 4,517,028 A | 5/1985 | Lindert .................. 148/6.14 |
| 4,689,085 A * | 8/1987 | Plueddemann .......... 106/287.14 |
| 4,795,506 A | 1/1989 | Sokalski ................. 148/6.14 |
| 4,812,363 A | 3/1989 | Bell ..................... 428/420 |
| 4,944,812 A | 7/1990 | Lindert .................. 148/251 |
| 4,963,596 A | 10/1990 | Lindert .................. 526/313 |
| 4,980,396 A | 12/1990 | Yoshida .................. 523/212 |
| 5,026,440 A | 6/1991 | Finnenthal ............... 148/247 |
| 5,039,770 A | 8/1991 | Lindert .................. 526/312 |
| 5,063,089 A | 11/1991 | Lindert .................. 427/354 |
| 5,108,793 A | 4/1992 | van Ooij et al. ........... 427/327 |
| 5,128,211 A | 7/1992 | Tesdahl .................. 428/472.3 |
| 5,200,275 A | 4/1993 | van Ooij ................. 428/623 |
| 5,209,788 A | 5/1993 | McMillen ................ 148/247 |
| 5,282,905 A | 2/1994 | Reichgott ................ 148/247 |
| 5,292,549 A | 3/1994 | van Ooij ................. 427/156 |
| 5,393,353 A | 2/1995 | Bishop .................. 148/253 |
| 5,397,390 A | 3/1995 | Gorecki ................. 106/287.11 |
| 5,433,773 A | 7/1995 | Harelstad ................ 106/14.13 |
| 5,433,976 A | 7/1995 | van Ooij ................. 427/327 |
| 5,472,523 A | 12/1995 | Harelstad ................ 148/255 |
| 5,478,655 A | 12/1995 | Sabata . ................. 428/469 |
| 5,518,770 A | 5/1996 | Goliaszewski . ........... 427/327 |
| 5,607,521 A | 3/1997 | Bech-Nielsen . ........... 148/261 |
| 5,612,421 A | 3/1997 | Goliaszewski ............ 525/326.5 |
| 5,639,555 A * | 6/1997 | Bishop .................. 428/447 |
| 5,641,542 A | 6/1997 | Melzer .................. 427/302 |
| 5,662,746 A | 9/1997 | Affinito ................. 148/247 |
| 5,674,936 A * | 10/1997 | Lucas ................... 524/731 |
| 5,700,523 A | 12/1997 | Petrole ................. 427/397.8 |
| 5,750,197 A | 5/1998 | van Ooij ................ 427/318 |
| 5,753,779 A | 5/1998 | Verberg ................. 525/369 |
| 5,759,629 A | 6/1998 | van Ooij ................ 427/384 |
| 5,801,217 A | 9/1998 | Rodzewich .............. 523/409 |
| 5,843,242 A | 12/1998 | Dolan ................... 148/272 |
| 5,846,342 A | 12/1998 | Aoyama ................. 148/271 |
| 5,859,106 A | 1/1999 | Jones ................... 524/406 |
| 5,859,107 A | 1/1999 | Jones ................... 524/406 |
| 5,868,820 A | 2/1999 | Claffey ................. 106/14.44 |
| 5,868,872 A | 2/1999 | Karmaschek ............. 148/247 |
| 5,882,799 A | 3/1999 | Roseboom ............... 428/461 |
| 5,961,809 A | 10/1999 | Roland .................. 205/199 |
| 5,993,567 A | 11/1999 | Dolan ................... 148/247 |
| 6,020,408 A * | 2/2000 | Suzuki et al. ............. 524/265 |
| 6,027,579 A | 2/2000 | Das ..................... 148/256 |
| 6,071,566 A | 6/2000 | Brown .................. 427/387 |
| 6,084,106 A | 7/2000 | Crook ................... 548/406 |
| 6,106,901 A | 8/2000 | Song .................... 427/387 |
| 6,132,808 A | 10/2000 | Brown .................. 266/235 |
| 6,215,011 B1 | 4/2001 | Bishop .................. 556/413 |
| 6,294,620 B1 | 9/2001 | Huang et al. ............. 525/452 |
| 6,652,977 B2 * | 11/2003 | Zhang ................... 428/450 |

FOREIGN PATENT DOCUMENTS

EP          0806450          11/1997

* cited by examiner

*Primary Examiner*—David Brunsman
(74) *Attorney, Agent, or Firm*—Neil E. Hamilton; James J. Sales; Renee J. Rymarz

(57) ABSTRACT

A metal-coupling composition composed of silane cross-linking and coupling agents wherein the coupling agent includes a vinyl moiety. The coupling composition is a replacement for iron-phosphatizing/chromate primering and chromate primering in zinc phosphatizing processes. In a preferred embodiment, the silane cross-linking agent has the following formula:

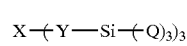

A.

and X is a trivalent group, each Y is independently a divalent group or series of divalent groups, each Q is independently —R or —OR and each R is independently a $C_{1-10}$ alkyl group or aryl group, and —OR group(s) are hydrolysable; and the silane coupling agent has the following formula:

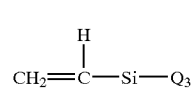

B.

each Q is independently —R or —OR and each R is independently a $C_{1-10}$ alkyl group or aryl group, and —OR group(s) are hydrolysable;

40 Claims, No Drawings

METAL COATING COUPLING COMPOSITION

CROSS-REFERENCE TO RELATED APPLICATIONS

NONE

STATEMENT REGARDING FEDERALLY SPONSORED RESEARCH OR DEVELOPMENT

NONE

BACKGROUND OF THE INVENTION

1. Technical Field

The present invention is directed to a metal coating coupling composition. More particularly, the invention is directed to a metal coating coupling composition, which is composed of (A) a silane cross-linking agent and (B) a silane coupling agent and applied in metal coating systems to enhance adhesion and improve corrosion resistance.

2. Background Art

A metal coating system is a chemical and/or physical joint system that includes a metallic substrate coated by a polymeric coating. A metallic substrate as hereinafter referred to includes all metallic surfaces of matter, such as ferrous metals, nonferrous metals, ferrous/nonferrous metal-coated items, ferrous/nonferrous alloys, ferrous/nonferrous alloy-coated items and the like. A polymeric coating as hereinafter referred to includes all organic coatings, such as, paint, lacquer, varnish, synthetic resin, ink, enamel and the like. The performance of a metal coating system is generally desired for longer service life and normally depends, besides upon quality of the substrate and the coating, significantly upon adhesion across each interface and upon cohesion across each layer in the metal coating system as well. A good corrosion resistance of a metal coating system results from the establishment of good adhesion and cohesion in such systems; whereas poor adhesion and/or cohesion usually cause coating delamination even blistering, which substantially diminishes the protection of a metal by a polymeric coating in a metal coating systems.

It is well known that a polymeric coating generally does not adhere well onto a metallic substrate due to incompatibilities of one another, additionally due to cleanliness of the substrates. Therefore, a metallic surface has to be cleaned and/or treated prior to applying a polymeric coating on it. In general, a metallic surface is cleaned first to remove any soils including oil, grease, metalworking fluid, fingerprint oil, lubricant, rust, scale, etc. Then, a conversion coating is applied to improve the compatibilities between two types of materials. As a result, the improvement of compatibilities enhances adhesion in a metal coating system and prolongs the service life of such system. Coatings may be of two types here, 1) phosphate conversion coatings and 2) primer coatings. A phosphate conversion coating, including iron and zinc phosphate coating, physically improves adhesion in a metal coating system; whereas, a primer coating chemically improves adhesion in a metal coating system. A primer is a type of adhesive, which includes primer, glue, gum, starch, and size, etc., termed upon the thickness of adhesive applied in a joint system. In general, the thickness of an adhesive layer applied on a metallic substrate in a metal coating system is within a magnitude of molecular level, which is commonly classified as a primer. The metal coating coupling composition of this invention is a primer used in metal coating systems, and, also, alternatively termed as "final seal", "final rinse", "passivating rinse", "post rinse", or "post-treatment" in the metal finishing industry.

It is also well known to employ a chromium-type primer, typically chromate and chromium phosphate, in a metal coating system to enhance adhesion and improve corrosion resistance. Chromium, a diverse element, demonstrates impressively acceptable performance and effectiveness in varieties of combination of metal coating systems including in conjunction with iron or zincphosphate conversion coating in terms of different types of metals or their alloys and different types of polymeric coatings. Accordingly, the chromate primer is widely considered and universally applicable in metal coating systems. In addition, the chromate treatment has the advantages of excellently anti-corrosive characteristics, and the use of chromate is relatively simple and inexpensive. Unfortunately, serious concerns of use of chromate primer and disposal of waste chromate solution have been raised regarding their negative effects to environment and human beings. Because chromate, specifically hexacovalent chromate, is toxic to the environment, carcinogenic to humans, and very difficult to recycle, even with extensive waste treatment procedures, as a result, considerable expense is contributed for handling, applying, and hazardous waste disposing. The eliminating or minimizing the use of the chromate primer had been an objective for a number of years. In the past, extensive research has been contributed to develop chromate-free type of primers used in metal coating systems, which may generally be classified, based upon the type of compound used, as silane coupling agents, polymeric materials, metallic compounds, and mixtures of them. In general, chromate-free metal coating coupling composition taught by previous arts for metal coating applications may be classified as following types based on chemical compounds:

1. Arts of Polymer Types
U.S. Pat. Nos. 4,433,015, 4,517,028, 4,795,506, 4,963,596, 5,039,770, 5,063,089, 5,868,820, 5,961,809, 4,191,596, 5,282,905, 5,641,542, 5,753,779, 5,433,773, and 5,472,523.

2. Arts of Silane/Silicate Types of Metal Coating Couplings
U.S. Pat. Nos. 5,108,793, 5,200,275, 5,700,523, 5,433,976, 5,478,655, 5,292,549, 6,071,566, 6,106,901, 6,132,808, 5,750,197, 5,759,629, 5,393,353, 6,084,106, 4,812,363, and 5,882,799.

3. Arts of Metallic Element Types
U.S. Pat. Nos. 1,710,743, 3,682,713, 3,695,942, 3,895,970, 4,148,670, 5,209,788, 5,868,872, 5,885,373, 6,027,579, 5,843,242, and 5,993,567.

4. Arts of Polymer/Silane Types
U.S. Pat. Nos. 5,612,421, and 5,846,342.

5. Arts of Polymer/Metallic Element Types
U.S. Pat. Nos. 5,859,106, 5,859,107, 5,662,746, 5,859,107, and 5,801,217.

6. Arts of Silane/Metallic Element Types
U.S. Pat. Nos. 5,026,440, 5,397,390, and 5,518,770.

7. Arts of Miscellaneous Types
U.S. Pat. Nos. 2,854,368, 3,975,214, 4,944,812, 5,868,820, 3,547,710, 5,128,211, 5,607,521, and 5,700,523.

Arts pertinent to metal coating coupling compositions used for metal coating applications cited hereinbefore indicate extensive and intensive researches have been conducted in the past, but, so far, the replacement of chromate primer for metal coating applications is not fully satisfactory. Summarily, each aforementioned have at least one of following limitations:

Inconsistent performance in term of adhesion and corrosion resistance for different types of polymeric coatings;

Costly operation, including high concentration of bath solution (up to 10% of active chemicals in working tank), expensive synthetics (some polymeric metal coating couplings), multi-package of products, and multi-step processes;

expensive manufacturing, such as some compositions requires days to hydrolyze and some remain significant unreacted raw materials;

Staining or discoloring metallic substrates;

High content of volatile organic compound (VOC);

Containing Heavy metal.

Among silane coupling agents, polymeric materials, metallic compounds and based upon the natural characteristics of metal coating systems, it is believed that highly polarized silane potentially contribute to form bonds, maybe covalent bonds, between a metal substrate and a coating in a metal coating system. A silane composition may function the same as chromate metal coating coupling does in metal coating systems to covalently bond a metal and a coating. Application of silane has prevalent advantages as a primer in metal coating system, for instance, inexpensive product, operable manufacturing, and no further environmental issues. Since silanes widely contribute to various types of organofunctional groups reactive to polymeric coatings and hydrolyzable groups reactive to metallic surface, silanes may contribute to enhance adhesion in a metal coating system specially and may replace iron-phosphatizing stage in phosphate processes.

It is an object of the present invention to provide a method to optimize or maximize performance to enhance adhesion and improve corrosion resistance in metal coating systems. Particularly, it is an object of the present invention to provide a selected-silane compound to apply in a specific metal coating system, which involves a polyester coating or its hybrid coating.

It is further object of the present invention to provide a metal coating coupling composition to enhance adhesion and improve corrosion resistance with or without conventional conversion coating, such as iron-phosphate conversion coatings, in metal coating systems.

Particularly, it is an object to apply an aqueous metal coating coupling composition on a bare metal surface, subsequently coated with a polyester coating or its hybrid coating to replace iron-phosphatizing, iron-phosphatizing/chromating process, or chromating involved in zinc-phosphatizing/chromating process without lowering the performance of such metal coating system. Replacements are illustrated as follows, respectively:

TABLE 1

Replacement of Iron-phosphatizing/chromating Process

| Proposed Process | Conventional Process |
| --- | --- |
| Preparation (s)* | Preparation(s)* |
| Application of Proposed Metal coating coupling composition | Iron Phosphatizing Water Rinsing Chromate Rinsing Water Rinsing** |

TABLE 1-continued

Replacement of Iron-phosphatizing/chromating Process

| Proposed Process | Conventional Process |
| --- | --- |
| Drying | Drying |
| Polymeric Coating | Polymeric Coating |

*Preparation(s) process may include degreasing and/or descaling stages, water rinsings as well.
**The process of exclusion of this stage after post-treatment, that is, no additional rinsing is need after applying of the metal coating coupling of this invention, is generally termed as "dried-in-place" technology.

TABLE 2

Replacement of Chromating in Zinc-Phosphatizing Process

| Proposed Process | Conventional Process |
| --- | --- |
| Preparation (s)* | Preparation(s)* |
| Zinc Phosphatizing | Zinc Phosphatizing |
| Water Rinsing | Water Rinsing |
| Proposed Metal coating coupling composition | Chromate Rinsing |
| | Water Rinsing** |
| Drying | Drying |
| Polymeric Coating | Polymeric Coating |

*Preparation(s) process may include degreasing and/or descaling stages, water rinsings as well.
**The process of exclusion of this stage after post-treatment, that is, no additional rinsing is need after applying of the metal coating coupling of this invention, is generally termed as "dried-in-place" technology.

It is another object of the present invention to provide an aqueous metal coating coupling composition, which works on bare metal substrate to replace chromate metal coating coupling compositions without lowering the performance in metal coating applications. The embodiment of this object is to provide an aqueous solution to be directly applied on clean metal surface, dry in place, and apply a polyester coating or its hybrid coating on, without lowering the performance of metal coating systems.

SUMMARY OF THE INVENTION

The metal coating coupling composition of this invention composed of (A) a silane cross-linking agent and (B) a silane coupling agent. The metal coating coupling composition is applied in metal coating systems in order to enhance adhesion and improve corrosion resistance. Particularly, the metal coating coupling composition is useful as a metal coating coupling in metal coating system, in which polyester coating or its hybrid coating is applied. (A) A silane cross-linking agent and (B) a silane coupling agent have the following formula, respectively:

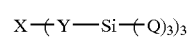
A.

and X is a trivalent group, each Y is independently a divalent group or series of divalent groups, each Q is independently —R or —OR and each R is independently a $C_{1-10}$ alkyl group or aryl group, and the —OR group(s) are hydrolysable;

The silane coupling agent has the formula

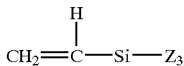

B.

each Z is independently —R or —OR, —OR, —OROR, or halogen and each R is independently a $C_{1-10}$ alkyl group or aryl group, and the —OR group(s) are hydrolysable.

The metal coating coupling composition includes an organic solvent.

In one embodiment X in Formula A is selected from the group consisting of

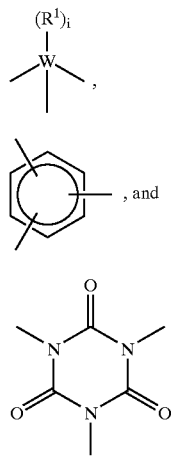

and W is C or P, $R^1$ is a H, $C_{1-10}$ alkyl or aryl, with the proviso that i is 1 when W is C, and i is 0 when W is not C, and each Y is independently

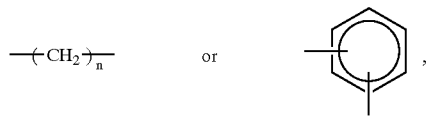

with n being an integer from about 1 to about 10.

In the most preferred embodiment, the silane cross-linking agent is tris-[3-(trimethoxysilyl)propyl] isocyanurate. The tris-[3-(trimethoxysilyl)propyl] isocyanurate is available from OSi Specialties and sold under the name Silquest® Y-11597. The other cross-linking agents generally described above can be obtained by employing the teachings of U.S. Pat. No. 4,100,129.

DETAILED DESCRIPTION

A most preferred (A) a silane cross-linking agent is the above-mentioned tris(gamma-trimethoxysilylpropyl) isocyanurate which is a methoxy-functional silane with triple trisubstituted silyl groups shaped as Y. It is believed that Silquest® Y-11597 may greatly improve the adhesion on difficult treated surfaces. The molecules of Silquest® Y-11597 may schematically be described before being hydrolyzed as following:

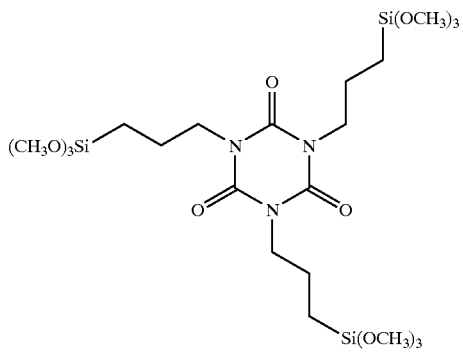

After hydrolyzing, molecules of Silquest® Y-11597 are activated and readily react to hydroxyl groups on a metal surface, silanol groups on other silane molecules including ones of silane coupling, and hydroxyl groups in a polymeric coating. Triple trisubstituted molecules of hydrolyzed Silquest® Y-11597 establish stronger covalent bonding with mineral surfaces including metallic surfaces. It is believed, after being hydrolyzed, since a triple trisubstituted molecule of Silquest® Y-11597 carries more hydroxyl groups than a linear silane cross-linking agents, such as 1,2-bis (triethoxysilyl)ethane (BTSE), molecules of Silquest® Y-11597 have greater potential to form hydrogen bonds with hydroxyl groups on mineral surfaces and eventually from stronger covalent bonds by liberating water during drying and/or curing, which may be illustrated as following bonding chain:

Where M represents any mineral surface and O is oxygen.

Triple trisubstituted molecules of Silquest® Y-11597 establish an well-orientated primering layer. It is also believed, since triple trisubstituted molecules of Silquest® Y-11597 immediate migrating onto mineral surface, hydroxyl groups carried by molecules of Silquest® Y-1 1597 partially react with hydroxyl groups on a mineral surface to form covalent bonds with mineral surface and most of them react to any oncoming hydroxyl groups carried by (A) silane crosslinking agent, (B) silane coupling agent, and even polymeric coating. Furthermore, molecules of hydrolyzed Silquest® Y-11597 improve the distribution and number of hydroxyl groups on a mineral surface. Since hydroxyl groups are active to hydrophilic groups and repellent to hydrophobic groups and more hydroxyl groups molecules of hydrolyzed Silquest® Y-11597 have, the more likely molecules of a silane coupling agent are orientated or stand up with hydrophobic head away form mineral surface. Triple trisubstituted molecules of Silquest® Y-11597 establish long-range, irregularly three-dimensional, and nonreversible network by cross-linking functionality of Silquest® Y-11597.

The metal coating coupling composition of this invention establishes better adhesion to polymeric coating. Hydrophobic or organofunctional groups in metal coating coupling composition concentrate outer layer of metal coating coupling, which are chemically reactive proportions to polymeric coatings and form covalent bonds with polymeric coatings. Furthermore, the primer layer crosslinked by Silquest® Y-11597 is irregular, in which molecules of polymeric coating interdiffuse or interlock or interpenetrate with molecules of metal coating coupling composition to form strong physical bonds.

A preferred (B) a silane coupling agent is vinyl-tris-(2-methoxyethoxy)silane available form OSi Specialties and sold under the name Silquest A-172. Its molecules of Silquest A-172 may be described before hydrolyzed as following:

$$CH_2=CHSi(OCH_2CH_2OCH_3)_3$$

Examples of other vinyl silane coupling agents are vinylmethyldimethoxysilane, vinyltrichlorosilane, vinyltriethoxysilane, vinyltrisopropoxysilane, vinyltrimethoxysilane, vinyl-tris-(2-methoxyethoxy)silane. They are also available from OSi Specialties. They are illustrated as follows:

TABLE 4

Vinyl Silane Coupling Agent

| Name | Formula |
|---|---|
| vinyl-tris-(2-methoxyethoxy) silane | $CH_2=CHSi(OCH_2CH_2OCH_3)_3$ |
| vinylmethyldimethoxysilane | $CH_2=CHSiCH_3(OCH_3)_2$ |
| vinyltrichlorosilane | $CH_2=CHSiCl_3$ |
| vinyltriethoxysilane | $CH_2=CHSi(OCH_2CH_3)_3$ |
| vinyltrisopropoxysilane | $CH_2=CHSi(OCH(CH_3)_2)_3$ |
| vinyltrimethoxysilane | $CH_2=CHSi(OCH_3)_3$ |

(A) The silane cross-linking agent and (B) silane coupling agents mentioned hereinbefore have to be partially or fully hydrolyzed, preferably fully hydrolyzed before being applied on a metallic surface, so that the silanes coupling agents and cross-linking agents are active to bond with each other, the metallic substrate, and the polymeric coating. During hydrolysis, R groups are replaced with a hydrogen atom. Hydrolysis of silanes may be accomplished by mixing with water, more favorably deionized water and maybe some selected solvent, which preferably has some chemical formula with R groups and improve the solubility of silanes.

The most preferred solvent for this invention is 2-methyl-2,4-pentanediol. Examples of other alcohol solvents include methanol, ethanol, 1-propanol, 1-butanol, isopropanol, isobutanol, sec-butanol, tert-butanol, 1-pentanol, 2-methyl-1-butanol, isopentyl alcohol, 2-pentanol, 3-pentanol, tert-pentyl alcohol, 1-hexanol, 4-methyl-2-pentanol, 2-ethyl-1-butanol, 2-methyl-1-pentanol, 1-heptanol, 2-heptanol, 3-heptanol, 1-octanol, 2-octanol, 2-ethyl hexanol, 3,5,5-trimethylhexanol, 1-nonanol, 2,6-dimethyl-4-heptanol, 1-decanol, 1-undecanol, 5-ethyl-2nonanol, 1-dodecanol, trimethylnonyl alcohol, tetradecanol, heptadecanol, 2-methylpentane-2,4-diol, ethylene glycol, 1,2-propanediol, 1,3-propanediol, 1,4-butanediol, 2,3-butanediol, 1,5-pentanediol, 2-butene-1,4-diol, 2-ethyl-1,3-hexaediol, glycerine, hexadecanol, octadecanol, pinacol, pentaerythritol, cyclohexanol, α-phenylethyl alcohol, 2-methylcyclohexanol, β-phenylethyl alcohol, benzyl alcohol, abietinol, and α-terpineol.

The most preferred formulation of the metal coating coupling composition of this invention is as follows:

TABLE 5

Metal coating Coupling Formula

| INGREDIENT | AMOUNT, in %/wt. |
|---|---|
| 2-methyl-2,4-pentanediol (hexylene glycol) | 90.00 |
| Silquest ® Y-11597 | 5.00 |
| Silquest ® A-172 | 5.00 |

The pH value of metal coating coupling solution of this invention is preferably adjusted below about 6, more preferably between from 3 to 6. Acidifying the metal coating coupling solution will improve hydrolysis and stability of hydrolyzed silane solution to longer shelf and/or service life during stocking/operating. The higher the pH, specifically above 6, has the greater potential to polymerization or gelation of the metal coating coupling solution. It is important to select a proper chemical to adjust the pH value of this metal coating coupling solution. In general, both organic and inorganic (mineral) acids are usable to adjust pH value of the metal coating coupling solution, but most organic acids interfere the performance of the metal coating coupling composition and stain or colorize metallic substrates, so a preferred pH adjusters for this metal coating coupling composition are inorganic acids. The most preferred acid is hexafluorotitanic acid. The most preferred pH ranges for immersion and spray application are 3.5–4.5 and 4.5–5.5, respectively, because any corrosion product or flash rust will prevent active the metal coating coupling composition of this invention from forming bonding with metallic surfaces.

When preparing the metal coating coupling composition of the present invention, it is generally preferred to employ (A) the silane cross-linking agent and (B) the silane coupling agent in a ratio of 1:10 to 10:1. The best preferred ratio is 1:1. The concentration of (A) the silane cross-linking agent and (B) the silane coupling agent of the present invention may be varied from 0.0001 to 40.0%/wt., respectively. The best preferred concentration of the metal coating coupling composition in a dilute aqueous solution in a working tank is from 0.01 to 20.0%/wt. In another preferred manner, the concentration of the silane cross-linking agent and coupling agent in an aqueous solution is 0.001 to 10%/wt. and the concentration of solvent is 0.01 to 40% in weight.

In the metal coating coupling formula described in Table 5, the amount of 2-methyl-2,4-pentanedial is designated at 90%/wt. This amount can vary from 0.01 to 99.9% in weight to provide very dilute aqueous solutions.

A method of making a concentrated metal coating coupling composition is provided which is readily dilutable into an aqueous solution. The concentrated composition has more than a 12-month shelf life and a 200° F. flash point.

EXAMPLE 1

This example illustrates the preparation of the metal coating coupling solution. A typical procedure for the preparation of the metal coating coupling solution of this invention is as follows: A clean container is charged with 99.89 units of water, preferable soft water, the most preferable deionized water, then adjust with hexafluorotitanic acid. 0.1 units of the metal coating coupling composition shown in TABLE 5 then is added in the acidic water. If the solution is applied by spray, the pH value should be adjusted with hexafluorotitanic acid to about 3.5–4.5. if immersion, about 4.5–5.5. However, this can vary from 1.0 to 12.0. Contacting time with metallic substrate is longer than 5 seconds and the most preferable contacting time is about 30–60 seconds. The applying temperature is from ambient to boiling temperature. The most preferable applying temperature is ambient temperature.

EXAMPLE 2

This example demonstrates the effectiveness of present invention as this metal coating coupling composition to be applied on bare metallic substrates, which were coated and reacted with polyester/TGIC and their hybrid coatings. Metal panels, standard cold-rolled steel panels were made available from Q-Panel Lab, were cleaned with alkaline cleaner Liquid MC-726 as made available for JohnsonDiversey, Inc. (about 2 ounces of cleaner per gallon of tap water at about 145 0F). Immersing or spraying the metal panels by Liquid MC-726, rinsing with water, achieved the cleanliness of cold-rolled steel panels. The clean metal panels were sprayed (for about 20–70 seconds) or immersed in the in use the metal coating coupling composition prepared by the procedures shown in EXAMPLE 1 at ambient temperature for about 60 seconds, and then dried by forced air or with an oven at temperature about from ambient to 400 0F for about at least 5 seconds. The resulting primed panels were subsequently painted (homogeneously coated with a polyester/TGIC paint). Panels were then scribed and salt fogged per ASTM B 117 for 840 hours.

The tested panels were subjected to a tape pull and knife scrape in a manner described by ASTM D 1654 Procedure A, Method 2. Mean creepage (coating lift) along the scribe was recorded in terms of time (hours) and millimeters of creepage. The data has been recorded in the following TABLE 6 and shows that the metal coating coupling composition of the present invention has good adhesion and corrosion resistant properties.

TABLE 6

| Polyester Coating | Creepage in millimeters | Rating |
| --- | --- | --- |
| DuPont, PFR-400-S9 | 2.0 | 7 |
| DuPont, PFW-500-S9 | 1.5 | 7 |
| Ferro, SP-2006 | 1.5 | 7 |
| Morton, 40-7008 | 3.0 | 6 |
| Morton, 40-1007 | 1.0 | 8 |

The preferable operation range is at a concentration of 0.01–2.0%/wt. It is not necessary to rinse the parts after the metal coating coupling composition is applied. The pH of the water is adjusted to 3.0–5.0 using an acidic material before adding the composition. The pH of the chemical solution should be maintained between 3.5–6.0. Normally, the pH will remain stable. However, if it needs to be adjusted, acidic material is used to lower it and alkaline material to raise it.

Higher temperature operation does not diminish the performance but will shorten the tank life by condensing reactive ingredients and changing the ratio of active functional groups and reactive sites on substrate. Higher spray pressure is always preferable. Lower pH will cause metal corrosion and higher pH will potentially cause solution gelling.

EXAMPLE 3

This example demonstrates the effectiveness of present invention as a metal coating coupling composition to replace iron-phosphate/non-chromate processes. All treated panels were coated with polyester/TGIC coatings. Procedures to pretreat all panels is as follows:

TABLE 7

| | Cleaning | Pickling | Iron Phosphating | Inventive Composition |
| --- | --- | --- | --- | --- |
| 1 | v | | | v |
| 2 | v | v | | v |
| 3 | v | | v | v |
| 4 | | | Bonderite ® 1000 P95 (non-chromate) As control panels | |

Metal panels were cleaned, if applied, with alkaline cleaner Liquid MC-726 as made available for JohnsonDiversey, Inc. (about 2.0 ounces of cleaner per gallon of tap water at about 145 0F); rinsed by water at ambient for 40 seconds; pickled, if applied, with acid cleaner FAC-106 as made available for JohnsonDiversey, Inc. (about 2.0 ounces of cleaner per gallon of tap water at about ambient temperature); rinsed by water at ambient for 40 seconds; iron-phosphated, if applied, with Secure Tec ES as made available for JohnsonDiversey, Inc. (about 3 ounces of cleaner per gallon of tap water at about 145 0F for 60 seconds); rinsed by water at ambient for 40 seconds. Then treated metal panels were sprayed (for about 20–70 seconds) or immersed in the in use metal coating coupling solution prepared by the procedures shown in EXAMPLE 1 at ambient temperature for about 60 seconds, and then dried by forced air or with an oven at about from ambient to 400 0F for about at lease 5 second. The resulting primed panels were subsequently painted (homogeneously coated with a polyester/TGIC paint) and then scribed and salt fogged per ASTM B 117 for 552 hours. The four panels in TABLE 7 purchased from ACT Laboratories, Inc., which are used as comparison and pretreated with Bonderite 1000™, the most commonly used type of industrial iron phosphate, and primed with Parcolene 95™, the most commonly used type of industrial non-chromate metal coating coupling. Iron phosphated panels have a coating weight of 40–60 mg/ft2. The purchased panels were subsequently painted (homogeneously coated with a polyester/TGIC paint such as Ferro, SP-2006 and Morton, 40–7008) and then scribed and salt fogged per ASTM B 117 for 552 hours.

The resulting test panels were subjected to a tape pull and knife scrape in a manner described by ASTM D 1654 Procedure A, Method 2. Mean creepage (coating lift) along the scribe was recorded in terms of time (hours) and millimeters of creepage. The data has been recorded in the following TABLE 8 and shows that the metal coating coupling composition of the present invention has good adhesion and corrosion resistant properties.

TABLE 8

| | Creepage in millimeter | |
| --- | --- | --- |
| | Ferro, SP-2006 | Morton, 40-7008 |
| 1 | 2 | 14 |
| 2 | 1.5 | 5.5 |
| 3 | 4.5 | 6 |
| 4 | 19 | 7.5 |

As indicated in EXAMPLE 1, hexafluorotitanic acid is employed to adjust the pH value. If desired, any inorganic compound could be employed which could contain titanium and/or zirconium ions.

It will thus be seen that there is now provided a coupling composition which affords improved priming of metal. While examples and certain embodiments are disclosed, others can be employed provided they afford the desired coupling capabilities. Other variations and modifications of this invention will be obvious to those skilled in this art. This invention is not to be limited except as set forth in the following claims.

I claim:

1. A metal coating coupling composition comprising a cross-linking agent having the formula:

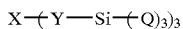   A.

and X is a trivalent group selected from the group consisting of

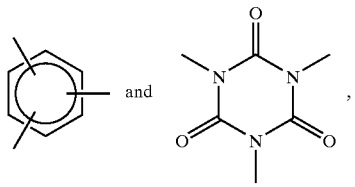

each Y is independently a divalent group, each Q is independently —R or —OR and each R is independently a $C_{1-10}$ alkyl group or aryl group;
a coupling agent having the formula:

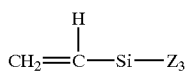   B.

and Z is independently —R, —OR, —OROR, or halogen and each R is independently a $C_{1-10}$ alkyl group or an aryl group; and
an organic solvent.

2. The metal coating coupling composition according to claim 1 wherein
Y is independently

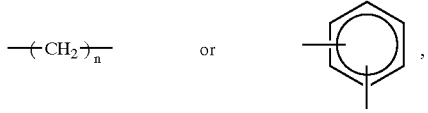

with n being an integer from about 1 to about 10.

3. The metal coating composition according to claim 1 wherein the cross-linking agent has the formula:

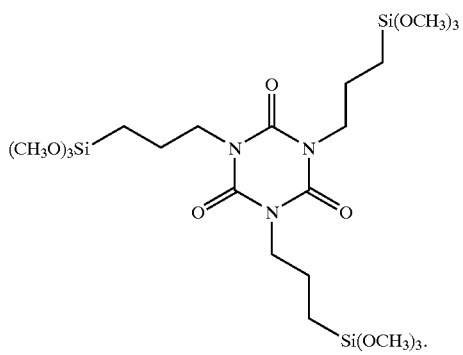

4. The metal coating composition according to claim 1 wherein the coupling agent is vinyl-tris-(2-methoxyethoxy) silane.

5. The metal coating coupling composition according to claim 1 wherein the cross-linking agent and the coupling agent are present in a ratio of from 1:10 to 10:1.

6. The metal coating coupling composition according to claim 1 wherein the concentration of the silane cross-linking agent is from 0.0001 to 40%/wt.

7. The metal coating coupling composition according to claim 1 wherein the concentration of the silane coupling agent is from 0.0001 to 40%/wt.

8. The metal coating coupling composition according to claim 1 wherein the solvent is 2-methyl-2,4-pentanediol in a concentration of from 0.01 to 99.9%/wt.

9. The metal coating coupling composition according to claim 1 having a 12-month shelf life and 200° F. flash point, wherein the concentration of the silane cross-linking and silane coupling agent is from 0.1 to 40%/wt. and the concentration of solvent is from 0.1 to 99.9%/wt.

10. The metal coating coupling composition according to claim 1 further including an acidic compound in its dilute solution.

11. A dilute aqueous solution of the metal coating coupling composition of claim 1 wherein the composition of claim 1 is dissolved in acidic water with the concentration from 0.001 to 10%/wt.

12. The dilute aqueous solution of claim 11 wherein the metal coating coupling composition is present in a concentration of 0.01 to 20.0%/wt.

13. A dilute aqueous solution as defined in claim 11 further including an acidic compound.

14. The dilute aqueous solution as defined in claim 13 wherein the acidic compound may includes titanium and/or ziconium ions.

15. The dilute aqueous solution as defined in claim 11 having a pH value from 1.0 to 12.0, a working of temperature of about ambient, and a contacting time of about 30–60 seconds.

16. The metal coating coupling composition according to claim 1 reacted with a polymer.

17. A method of treating bare metal surfaces employing the metal coating coupling composition according to claim 1.

18. The metal coupling composition according to claim 1 wherein the coupling agent is vinylmethyldimethoxysilane.

19. The metal coupling composition according to claim 1 wherein the coupling agent is vinyltrichlorosilane.

20. The metal coupling composition according to claim 1 wherein the coupling agent is vinyltriethoxysilane.

21. The metal coating coupling composition according to claim 20 wherein the solvent is present in an amount of about 90% by weight.

22. The metal coating coupling composition according to claim 1 wherein the coupling agent is vinyltrimethoxysilane.

23. The metal coating composition according to claim 1 wherein the coupling agent is vinyltrimethoxysilane.

24. The metal coating composition according to claim 1 wherein the organic solvent is a glycol.

25. A metal coating coupling composition comprising a cross-linking agent having the formula:

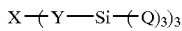   A.

and X is a trivalent group, each Y is independently a divalent group, each Q is independently —R or —OR and each R is independently a $C_{1-10}$ alkyl group or aryl group;

a coupling agent having the formula:

$$CH_2=\overset{H}{\underset{|}{C}}-Si-Q_3 \quad \text{B.}$$

and Z is independently —R, —OR, —OROR, or halogen and each R is independently a $C_{1-10}$ alkyl group or an aryl group; and
  a glycol solvent.

26. The metal coating coupling composition according to claim 25 wherein X is

[benzene ring structure] and [trimethyl isocyanurate ring structure]

and Y is independently $-(CH_2)_n-$ or [substituted benzene ring], with n being an integer from about 1 to about 10.

27. The metal coating composition according to claim 25 wherein the cross-linking agent has the formula:

[tris(3-trimethoxysilylpropyl) isocyanurate structure with Si(OCH₃)₃ groups]

28. The metal coating composition according to claim 25 wherein the coupling agent is vinyl-tris-(2-methoxyethoxy) silane.

29. The metal coating coupling composition according to claim 25 wherein the solvent is 2-methyl-2,4-pentanediol in a concentration of from 0.01 to 99.9%/wt.

30. The metal coating coupling composition according to claim 25 further including an acidic compound in its dilute solution.

31. The metal coupling composition according to claim 25 wherein the coupling agent is vinylmethyldimethoxysilane.

32. The metal coating composition according to claim 25 wherein the coupling agent is vinyltrichlorosilane.

33. The metal coating composition according to claim 25 wherein the coupling agent is vinyltriethoxysilane.

34. The metal coating coupling composition according to claim 25 wherein the coupling agent is vinyltriisopropoxysilane.

35. The metal coating coupling composition according to claim 25 wherein the coupling agent is vinyltrimethoxysilane.

36. A metal coating coupling composition comprising a cross-linking agent having the formula:

$$X-(Y-Si-(Q)_3)_3 \quad \text{A.}$$

and X is a trivalent group, each Y is independently a divalent group, each Q is independently —R or —OR and each R is independently a $C_{1-10}$ alkyl group or aryl group;
  a coupling agent having the formula:

$$CH_2=\overset{H}{\underset{|}{C}}-Si-Z_3$$

and Z is indpendently —R, —OR, —OROR, or halogen and each R is independently a $C_{1-10}$ alkyl group or an aryl group; and
  2-methyl-2,4-pentanediol.

37. The metal coating coupling composition according to claim 36 wherein X is

[benzene ring structure] and [trimethyl isocyanurate ring structure]

and Y is independently $-(CH_2)_n-$ or [substituted benzene ring], with n being an integer from about 1 to about 10.

38. The metal coating composition according to claim 36 wherein the cross-linking agent has the formula:

[tris(3-trimethoxysilylpropyl) isocyanurate structure with Si(OCH₃)₃ groups]

39. The metal coating composition according to claim 36 wherein the coupling agent is vinyl-tris-(2-methoxyethoxy) silane.

40. A metal coating coupling composition comprising a cross-linking agent having the formula:

$$X-(Y-Si-(Q)_3)_3 \quad \text{A.}$$

and X is a trivalent group selected from the group consisting of

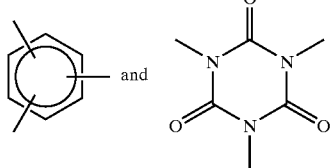
each Y is independently a divalent group, each Q is independently —R or —OR and each R is independently a $C_{1-10}$ alkyl group or aryl group;
a vinyl silane coupling agent; and
an organic solvent.
* * * * *

UNITED STATES PATENT AND TRADEMARK OFFICE
CERTIFICATE OF CORRECTION

PATENT NO.       : 6,887,308 B2                                      Page 1 of 1
APPLICATION NO.  : 10/348319
DATED            : May 3, 2005
INVENTOR(S)      : Jun Qing Zhang It is certified that error appears in the above-identified patent and that said Letters Patent is hereby corrected as shown below:

Original Claim 21 was omitted from the issued patent. Please insert --21. The metal coating coupling composition according to Claim 1 wherein the coupling agent is vinyltriisopropoxysilane.--

Col. 12, line 48
  replace "21"
  with --24--.

Col. 12, line 54
  replace "23"
  with --22-- and insert the word "coating" after the word --metal--.

Col. 12, line 56
  replace "24"
  with --23--.

Col. 13, line 5
  replace "Q3"
  with --Z3--

Signed and Sealed this

Fifth Day of June, 2007

JON W. DUDAS
*Director of the United States Patent and Trademark Office*